United States Patent [19]

Sheng

[11] 3,897,489

[45] July 29, 1975

[54] OXIDATION OF ISOBUTYLENE GLYCOL TO ALPHA HYDROXYISOBUTYRIC ACID

[75] Inventor: Ming N. Sheng, Cherry Hill, N.J.

[73] Assignee: Atlantic Richfield Company, Los Angeles, Calif.

[22] Filed: Apr. 29, 1974

[21] Appl. No.: 464,881

Related U.S. Application Data

[63] Continuation of Ser. No. 308,201, Nov. 20, 1972, abandoned.

[52] U.S. Cl. ............................................. 260/531 R
[51] Int. Cl.$^2$ .................... C07C 51/28; C07C 59/04
[58] Field of Search ................................ 260/531 R

[56] References Cited
FOREIGN PATENTS OR APPLICATIONS
1,035,639   5/1956   Germany ......................... 260/531 R OTHER PUBLICATIONS
Heyns et al.; Tetrahedron, 1960, Vol. 9, pp. 67–75.

Primary Examiner—Anton H. Sutto
Assistant Examiner—Richard D. Kelly
Attorney, Agent, or Firm—John R. Ewbank

[57] ABSTRACT

Method for the production of alpha-hydroxyisobutyric acid by the catalytic oxidation of isobutylene glycol with molecular oxygen, such as air or pure oxygen in neutral or acidic aqueous solution. The process gives a high yield (80 – 90 per cent) of alpha-hydroxyisobutyric acid which can be recovered readily. The compound is a useful intermediate for the preparation of methacrylic acid and esters of methacrylic acid by conventional techniques.

11 Claims, No Drawings

OXIDATION OF ISOBUTYLENE GLYCOL TO ALPHA HYDROXYISOBUTYRIC ACID

REFERENCE TO OTHER APPLICATIONS

This is a continuation-in-part of Ser. No. 308,201, filed Nov. 20, 1972, now abandoned.

BACKGROUND OF THE INVENTION

It is known that carboxylic acids can be produced from the corresponding primary alcohols by oxidizing an aqueous solution of the alcohol in the presence of oxygen, a base and a platinum catalyst, see for example C. K. Heyns and H. Paulsen, "Newer Methods of Preparative Organic Chemistry," Vol. II, pp. 303, (1963). However it is also known that when primary alcohol groups are oxidized in neutral to weakly acidic aqueous solutions the alcohols are oxidized to the aldehyde stage and the yields of the aldehyde are not always satisfactory.

When carboxylic acids are prepared in basic solutions the salt of the acid is of course produced and in general it has been found that the highest conversions and yields are obtained when equimolar quantities of the base and the alcohol are used since this produces the salt of the acid in almost quantitative yields. The carboyxlic acid salts are however completely soluble in water and thus in order to obtain the acids it is necessary to neutralize the aqueous solution of the carboxylic acid salt thus producing the inorganic salt and organic acid. For example if the base is a sodium compound such as sodium hydroxide or sodium carbonate the sodium salt of the carboxylic acid is produced and this solution is then neutralized with sulfuric acid to produce the organic acid and sodium sulfate. Two problems then arise, namely, the separation of the organic acid and since it is frequently soluble in water this requires the use of a proper organic solvent for extraction leaving the sodium sulfate, or other salt, which presents a disposal problem and an economic loss.

It has now been found quite unexpectedly in view of the teachings in the prior art that isobutylene glycol is completely unique in that it is the only alcohol which has been found that can be oxidized in neutral or weakly acidic aqueous solutions in the presence of a catalyst to give high yields of the acid itself, namely, alpha-hydroxyisobutyric acid. Excellent yields are obtained and of equal importance is the fact that high purity alphahydroxyisobutyric acid can be recovered simply by filtering the catalyst from the solution and then removing the water by distillation. The advantage of this process wherein a neutral or acid solution is employed is obvious compared with utilizing the prior art basic method since in that method after filtration the reaction products must be acidified, the water removed by distillation and the residue consisting of a mixture of the alpha-hydroxyisobutyric acid and inorganic salt must be extracted with an organic solvent to separate the alpha-hydroxyisobutyric acid from the organic salt. Such advantages of this process can also be clarified by emphasizing the inherent absence of ionizable metal compositions from the reaction mixture, purification intermediates, and purified products, inasmuch as the cumbersomeness of many prior art processes is attributable primarily to the presence of an ionizable metal composition such as sodium carbonate.

The alpha-hydroxyisobutyric acid then can be dehydrated to the highly useful compound, methacrylic acid, by known methods, for example, as shown in U.S. Pat. No. 3,562,320 (1971).

SUMMARY OF THE INVENTION

This invention relates to a method for catalytically oxidizing isobutylene glycol with molecular oxygen, such as air or pure oxygen in neutral or acidic aqueous solution to produce alpha-hydroxyisobutyric acid, which acid can then be recovered merely by filtering the catalyst from the aqueous solution and distilling the water from the filtrate.

It is an object of this invention therefore to provide an improved method for the production of alpha-hydroxyisobutyric acid by the catalytic oxidation of isobutylene glycol.

It is another object of this invention to provide a method for the production of alpha-hydroxyisobutyric acid which allows the acid to be recovered directly without the production of undesirable by-products which would present pollution problems.

It is another object of this invention to provide a method for the catalytic oxidation of isobutylene glycol with air or oxygen to produce alpha-hydroxyisobutyric acid and avoid formation of the salts of such acid.

Other objects of this invention will be apparent from the following detailed description and from the claims.

DETAILED DESCRIPTION OF THE INVENTION

The isobutylene glycol employed in the process of this invention is preferably free of other compounds which would contaminate the product.

The oxidation can be carried out either batch-wise or continuously at temperatures ranging from room temperature, i.e. 25° C., to 150° C. with temperatures from 50° C. to 100° C. being preferred and from 65° C. to 85° C. being more preferred. The oxidation is carried out in the liquid phase with the isobutylene glycol concentration in the aqueous solution ranging from 1 weight per cent to 30 weight per cent, with 5 weight per cent to 15 weight per cent being preferred. Water is the preferred solvent at a pH of 7, i.e., neutral, however, the solution can also be acidic, for example by the use of small quantities of a mineral acid, such as hydrochloric or sulfuric acid, or organic acids, such as acetic, pH's below about 2, however are not preferred. In order to maintain the reaction medium in the liquid phase, if temperatures above 100° C. are employed, it is of course necessary to use superatmospheric pressure however at temperatures of 100° C. or below atmospheric pressure is completely satisfactory. Although water or an aqueous acidic solution is preferred, certain organic solvents, such as dioxane can be used as a co-solvent with the water, but it does not give any particularly noticeable advantage, and some solvents should be avoided completely, for example acetone and acetonitrile.

The oxidizing agent is molecular oxygen and can be either in the form of pure oxygen, oxygen diluted with other gases, such as nitrogen, argon or the like, or merely air. On the one hand, air is of course cheaper than pure oxygen, however it requires handling of larger volumes of gas overall, and therefore the choice of the particular form of the molecular oxygen becomes one of balancing economic factors.

The catalysts which can be employed are those normally utilized in the prior art methods for the oxidation of primary alcohols with oxygen in basic solutions. In general these are the supported noble metal catalysts, such as supported platinum or palladium. It has been found that commercial supported platinum catalysts or palladium catalysts and the commercial catalysts in this field, such as 5 weight per cent platinum on carbon, 10 weight per cent platinum on carbon, 5 weight per cent platinum on alumina, 5 weight per cent or 10 weight per cent palladium on carbon and the like can be employed. These catalysts are available commercially from a variety of catalysts manufacturers as are similar catalysts useful in the aforementioned basic process for the oxidation of primary alcohols. The amount of catalyst is the ordinary catalytic amount employed in heterogeneous liquid phase catalytic reactions, for example, from about 0.001 to 0.01 gram of the metal per gram of the isobutylene glycol. In general about 0.003 gram of the metal per gram of the isobutylene glycol is completely satisfactory.

The critical and novel feature of this invention is the discovery that isobutylene glycol, although a primary alcohol, can be oxidized under neutral or acidic conditions to produce the acid, i.e., alpha-hydroxyisobutyric acid, whereas other primary alcohols when oxidized under neutral or acidic conditions with the same catalyst produce the aldehydes. By producing the acid instead of its salt the recovery of the acid and the catalyst is greatly simplified and since the acid is used for the production of the valuable monomer, methacrylic acid, the instant process provides an important advantage in this art.

The following Examples are provided to illustrate the invention in further detail. In these Examples conventional laboratory equipment was used, i.e. a flask provided with a stirrer, thermometer, heating means, and means for bubbling oxygen into the reaction mixture. The reaction conditions are set forth in each Example. Analyses were made by nuclear magnetic resonance spectroscopy (NMR) with a precision of ±6 per cent.

EXAMPLE I

This Example shows the effect of pH on the oxidation of isobutylene glycol.

Temperature: 80° C.
Pressure: Atmospheric pressure.
Charge: 80 g of 10 weight per cent isobutylene glycol in water and 0.5 g. of commercial 5 weight per cent platinum on carbon catalyst. Oxygen was bubbling into the reaction mixture at 3.4 liters/hr.
Acid: 1 N HCl solution was used to acidify the reaction mixture.

TABLE I

| Run No. | pH | Time (Hours) | Wt. % Conversion of Isobutylene Glycol |
|---|---|---|---|
| 1 | 11.8[a] | 4 | 83 |
|  |  | 6 | 100 |
| 2 | 4[b] | 4 | 53 |
|  |  | 7 | 70 |
|  |  | 23 | 97 |
| 3 | 3 | 4 | 31 |
|  |  | 7 | 56 |
|  |  | 23 | 89 |
| 4 | 2 | 4 | 21 |
|  |  | 7 | 36 |
|  |  | 23 | 70 |
| 5 | 1 | 4 | 0 |
|  |  | 7 | 0 |
|  |  | 23 | 23 |

[a] Equimolar quantities of sodium carbonate and isobutylene glycol were used.

TABLE I-Continued

| Run No. | pH | Time (Hours) | Wt. % Conversion of Isobutylene Glycol |
|---|---|---|---|

[b] No acid or base were added into the reaction mixture, the distilled water had not been heated to eliminate dissolved $CO_2$, hence it had a pH of from 4 to 5.

These results show that high conversions are attained by the basic method of the prior art which produces the salt of the acid, but that pH's as low as 2 can be employed, preferably however the solution should be about neutral.

EXAMPLE II

This Example shows the effect of temperature on the oxidation of isobutylene glycol.

Charge: 80 g of 10 weight per cent isobutylene glycol in water and 0.5 g of 5 weight per cent platinum on carbon.
Oxygen was bubbling into the reaction mixture at 3.4 liters/hr.
Pressure: Atmospheric pressure.

TABLE II

| Run No. | Temp., °C. | Time, Hr. | Wt. % Conv. Of Isobutylene Glycol | Wt. % Yield[c] |
|---|---|---|---|---|
| 6 | 70 | 4 | 39 | 100 |
|  |  | 7 | 46 | 93 |
|  |  | 23 | 72 | 99 |
| 7 | 80 | 4 | 53 | 80 |
|  |  | 7 | 70 | 78 |
|  |  | 23 | 97 | 80 |
| 8 | 90 | 4 | 62 | 60 |
|  |  | 7 | 89 | 66 |
|  |  | 23 | 100 | 57 |
| 9 | 100[a] | 7 | 48 | 27 |
| 10 | 100[b] | 4 | 63 | 70 |
|  |  | 7 | 69 | 70 |

[a] Reflux temperature.
[b] This run was carried out by heating a mixture of isobutylene glycol (20 g), $H_2O$ (180 g), and 5 weight per cent platinum on carbon (1 g) in a 1 liter stirred autoclave at 100°C. and under 1200 psig of air.
[c] Yield is weight per cent alpha-hydroxyisobutyric acid based on weight of isobutylene glycol converted.

These results show higher yields at the lower temperatures, but with lower conversions and vice-versa. A temperature of about 80° C. appears to be about optimum.

EXAMPLE III

This Example shows the effect of glycol concentration on the oxidation of isobutylene glycol.

Temperature: 80° C.
Pressure: Atmospheric pressure.
Charge: 80 g of an aqueous solution of isobutylene glycol and 0.5 g of 5 weight per cent platinum on carbon. Oxygen was bubbling into the reaction mixture at 3.4 liters/hr.

TABLE III

| Run No. | Wt. % Glycol | Time, Hr. | Wt. % Conv. of Isobutylene Glycol | Wt. % Yield[b] |
|---|---|---|---|---|
| 11 | 5 | 4 | 54 | 88 |
|  |  | 7 | 69 | 89 |
|  |  | 23 | 100 | 86 |
| 12 | 10 | 4 | 53 | 80 |
|  |  | 7 | 70 | 78 |
|  |  | 23 | 97 | 80 |
| 13 | 10[a] | 4 | 51 | 82 |

TABLE III-Continued

| Run No. | Wt. % Glycol | Time, Hr. | Wt. % Conv. of Iso-butylene Glycol | Wt. % Yield[b] |
|---|---|---|---|---|
|  |  | 7 | 64 | 88 |
|  |  | 23 | 93 | 83 |
| 14 | 15 | 4 | 29 | 87 |
|  |  | 7 | 49 | 83 |
|  |  | 23 | 85 | 88 |

[a] Duplicate of run 12.
[b] Yield is weight per cent alpha-hydroxyisobutyric acid based on weight of isobutylene glycol converted.

These runs show that a concentration of from 5 to 15 weight per cent is preferred with about 10 per cent being somewhat more preferred.

EXAMPLE IV

This Example shows the solvent effect on the oxidation of isobutylene glycol. The runs were carried out by heating a mixture of isobutylene glycol (10 g), solvent (90 g) and 5 weight per cent platinum on carbon (0.5 g) in a 300 ml stirred titanium autoclave at 80° C. and under 1,160 psig of air.

TABLE IV

| Run No. | H₂O, g | Solvent, g | Time, Hr. | Wt. % Conv. of Isobutylene Glycol | Wt. % Yield[a] |
|---|---|---|---|---|---|
| 15 | 90 | — | 7 | 42 | 77 |
| 16 | 45 | Dioxane, 45 | 16 | 25 | 87 |
| 17 | 45 | Acetone, 45 | 17 | 0 | 0 |
| 18 | 45 | Acetonitrile, 45 | 4 | 0 | 0 |

[a] Yield is weight per cent alpha-hydroxyisobutyric acid based on weight of isobutylene glycol.

These runs show that although dioxane can be employed as a co-solvent it offers no distinct advantage and certain other organic solvents should be avoided completely.

EXAMPLE V

This Example shows the influence of catalyst on the oxidation of isobutylene glycol.
Temperature: 80° C.
Pressure: Atmospheric pressure.
Charge: 80 g of 10 weight per cent isobutylene glycol in water and catalyst. The catalysts are all commercial catalysts and are from various manufacturers. Oxygen was bubbling into the reaction mixture at 3.4 liters/hr.

TABLE V

| Run No. | Catalyst, g | Time, Hr. | Wt. % Conv. of Isobutylene Glycol | Wt. % Yield[a] |
|---|---|---|---|---|
| 19 | 5 wt. % Pt/c 0.5 | 4 | 53 | 80 |
|  |  | 7 | 70 | 78 |
|  |  | 23 | 97 | 80 |
| 20 | 5 wt. % Pt/c 1.0 | 4 | 42 | 43 |
|  |  | 7 | 68 | 42 |
|  |  | 23 | 100 | 40 |
| 21 | 10 wt. % Pt/c 0.5 | 4 | 29 | 65 |
|  |  | 7 | 58 | 55 |
|  |  | 23 | 100 | 51 |
| 22 | 5 wt. % Pt/Al₂O₃ 0.5 | 23 | 90 | 30 |

TABLE V-Continued

| Run No. | Catalyst, g | Time, Hr. | Wt. % Conv. of Isobutylene Glycol | Wt. % Yield[a] |
|---|---|---|---|---|
| 23 | 5 wt. % Pd/c 0.5 | 23 | 0 | 0 |
| 24 | 10 wt. % Pd/c 0.5 | 7 | 11 | 60 |

[a] Yield is weight per cent alpha-hydroxyisobutyric acid based on weight of isobutylene glycol converted.

These results show that a carbon supported platinum catalyst is preferred and that high catalysts concentrations although increase the conversion tend to decrease the yield.

I claim:

1. The method for the production of alpha-hydroxyisobutyric acid which comprises catalytically oxidizing in the presence of a supported platinum catalyst isobutylene glycol with molecular oxygen in an aqueous solution having a pH in the range of from about 2 to 7, ionizable metal compounds being absent from said solution.

2. The method according to claim 1, wherein the oxidation is carried out in the range of from 25°C. to 150°C.

3. The method according to claim 1, wherein the aqueous solution is substantially neutral.

4. The method according to claim 1, wherein the aqueous solution has been acidified to a pH not below about 2.

5. The method according to claim 1, wherein oxidation is carried out at a temperature in the range of from 65°C. to 85°C. in the presence of a supported platinum catalyst.

6. The method according to claim 3, wherein the catalyst is platinum supported on carbon.

7. The method according to claim 5, wherein the catalyst is platinum supported on alumina.

8. The method according to claim 1, wherein the oxidation is carried out in the range of from 65°C. to 85°C. in the presence of a catalyst consisting of platinum supported on carbon.

9. The method according to claim 1, wherein dioxane is utilized as a co-solvent with the aqueous solution, which dioxane is removed with the water by distillation.

10. The method for the production of alpha-hydroxyisobutyric acid consisting essentially of;
catalytically oxidizing in the presence of a supported platinum catalyst isobutylene glycol with molecular oxygen in an aqueous solution having a pH in the range of from about 2 to 7 and at a temperature in the range of 25°C. to 150°C. ionizable metal compounds being absent from said solution;
removing the supported platinum catalyst by filtration;
thereafter recovering the alpha-hydroxyisobutyric acid by removing water by distillation.

11. The method according to claim 10 wherein the catalyst is platinum supported on carbon.

* * * * *

UNITED STATES PATENT OFFICE
CERTIFICATE OF CORRECTION

PATENT NO. : 3,897,489
DATED : July 29, 1975
INVENTOR(S) : Ming N. Sheng

It is certified that error appears in the above—identified patent and that said Letters Patent are hereby corrected as shown below:

Claim 6, first line, "The method according to claim 3,"

should read: -- The method according to claim 5, --

Signed and Sealed this fourteenth Day of October 1975

[SEAL]

Attest:

RUTH C. MASON
*Attesting Officer*

C. MARSHALL DANN
*Commissioner of Patents and Trademarks*